Oct. 31, 1933.　　　　J. W. WHITE　　　1,933,199
WHEEL
Filed March 5, 1929　　　2 Sheets-Sheet 1

Inventor
JOHN WILLIAM WHITE by
Roberts, Cushman + Woodberry.
Attorney

Oct. 31, 1933.    J. W. WHITE    1,933,199
WHEEL
Filed March 5, 1929    2 Sheets-Sheet 2
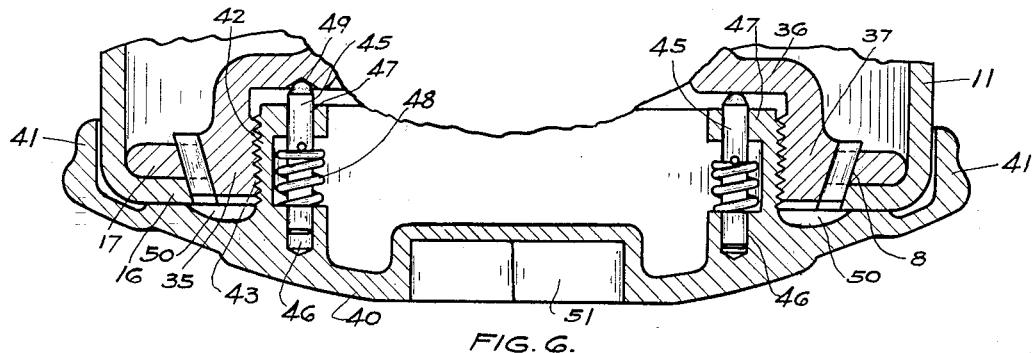
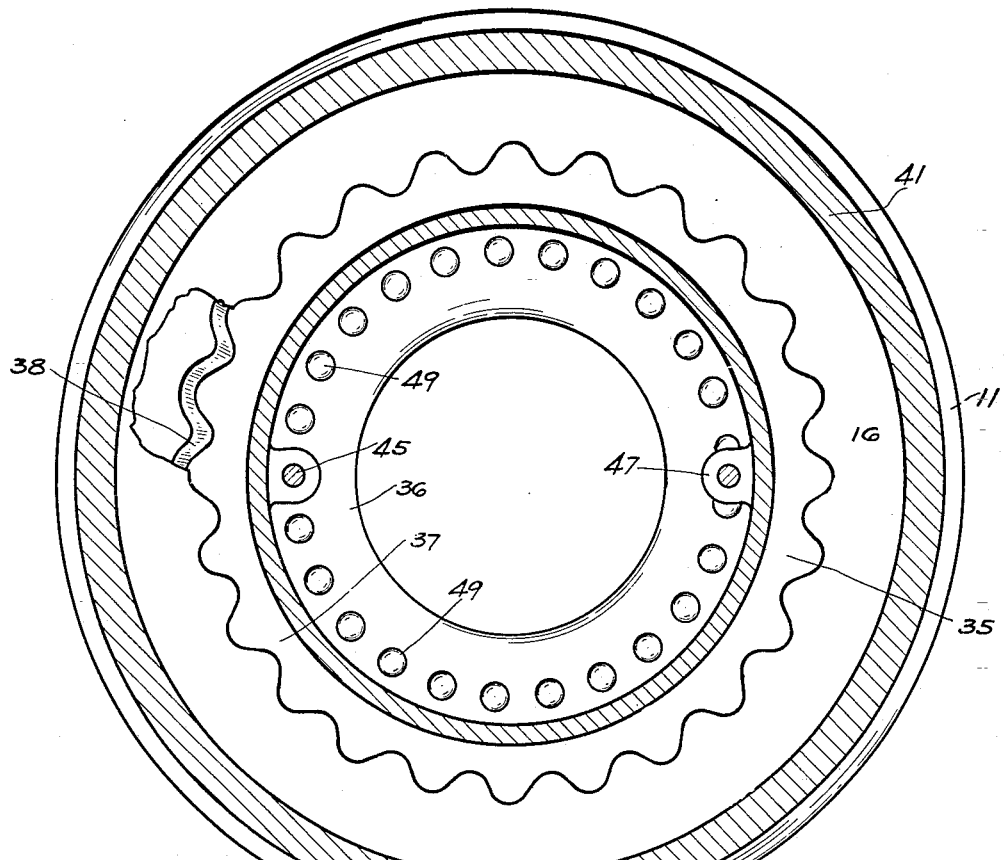
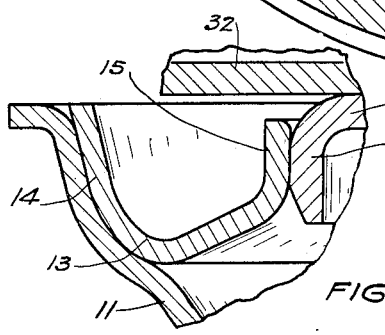
Inventor
JOHN WILLIAM WHITE
by Roberts, Cushman & Woodbury
Attorney Patented Oct. 31, 1933

1,933,199

UNITED STATES PATENT OFFICE 1,933,199

WHEEL

John William White, Buffalo, N. Y., assignor to Kelsey-Hayes Wheel Corporation, Detroit, Mich., a corporation of New York Application March 5, 1929. Serial No. 344,258

17 Claims. (Cl. 301—9)

This invention relates to an improvement in wheels and particularly in demountable and interchangeable wheels of the type such as are set forth in my copending application, Serial No. 308,615, filed September 27, 1928, in which the drive is transmitted between the inner hub and hub shell at the outer ends thereof.

The primary object of this invention is to provide in a wheel of that type, an interlocking connection between the outer end of the hub shell and the outer end of the hub whereby power is transmitted between shell and hub, and means independent of such connection for uniting the shell and hub.

Another object of this invention is to provide in such a wheel, an interlocking connection comprising a pair of intermeshing corrugated surfaces, which surfaces not only transmit power but determine the limit of assembly of the shell and hub.

Other objects of the invention will appear from a consideration of the following specification taken in connection with the drawings, in which Fig. 1 is a side elevation with parts in section of a wheel embodying this invention mounted upon a hub which is freely rotatable upon the end of an axle;

Fig. 6 is an enlarged cross section of the outer end of the hub shell and hub;

Fig. 7 is an enlarged end elevation of the outer end of a hub shell and hub, a portion of the shell being broken away; and Fig. 8 is an enlarged detail view illustrating the manner of mounting the inner end of the hub shell upon a hub.

Figure 1:
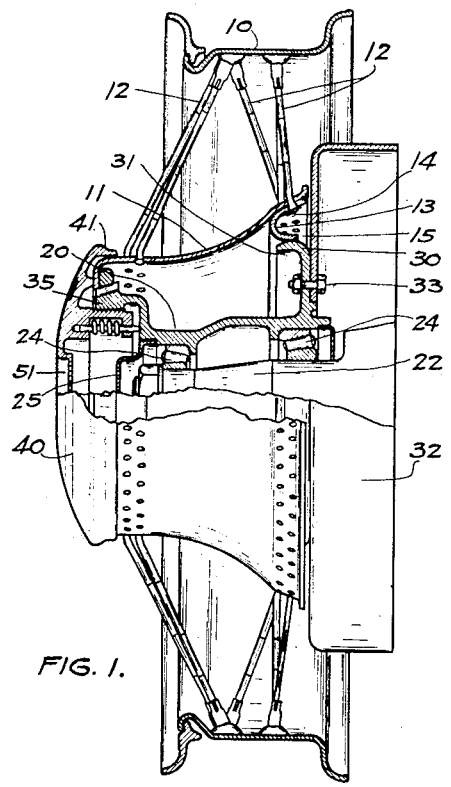

The wheel comprises a rim 10 and a hub shell 11 connected to the rim by a series of rows of spokes 12 extending from the rim to the inner and outer ends of the hub shell. Mounted within the inner end of the hub shell is a ring 13 U-shaped in cross section, the wall 14 thereof resting against the inner face of the hub shell and the wall 15 having a function to be pointed out later. The spokes 12 extending from the inner end of the hub shell to the rim may, as here shown, be passed through the portion 14 of the ring 13 which thus acts to reinforce the inner end of the hub shell. The hub shell 11 terminates at its outer end in an inturned flange 16 which is preferably reinforced by a ring 17 secured to the inner face thereof in any desired manner. The inner edges of the flange 16 and ring 17 are provided with conical corrugations 18, such corrugations extending inwardly and outwardly as will appear from an examination of Fig. 6.

Figure 2:
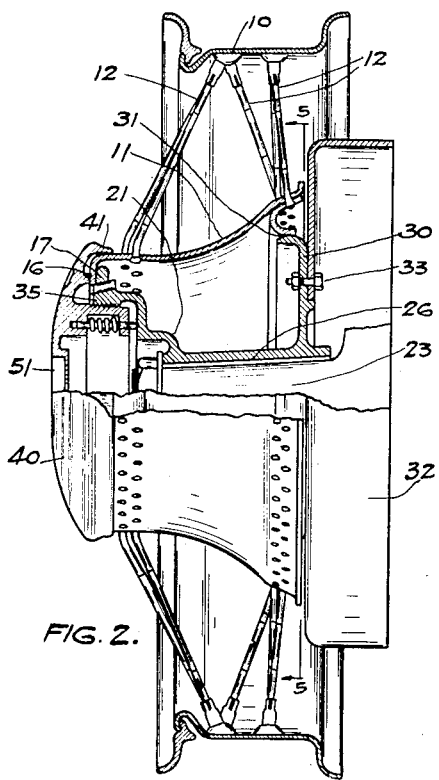
Fig. 2 is a view similar to Fig. 1 of the same wheel mounted upon a hub of the type connected to and driven by an axle.
Figure 3:
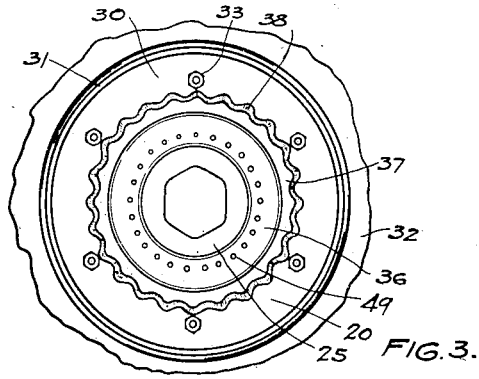
Fig. 3 is an end elevation of the hub shown in Fig. 1.
Figure 4:
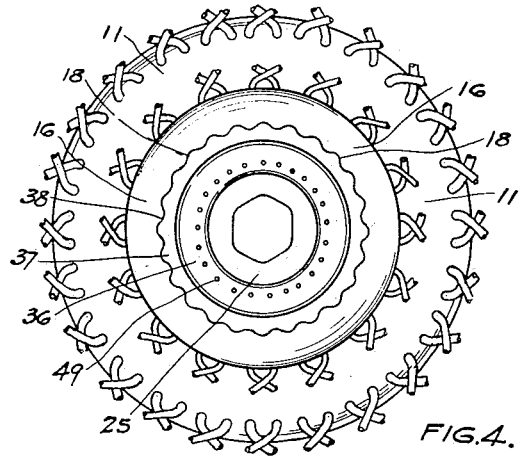
Fig. 4 is an end elevation of a wheel mounted upon the hub shown in Fig. 3, the cap being removed.
Figure 5:
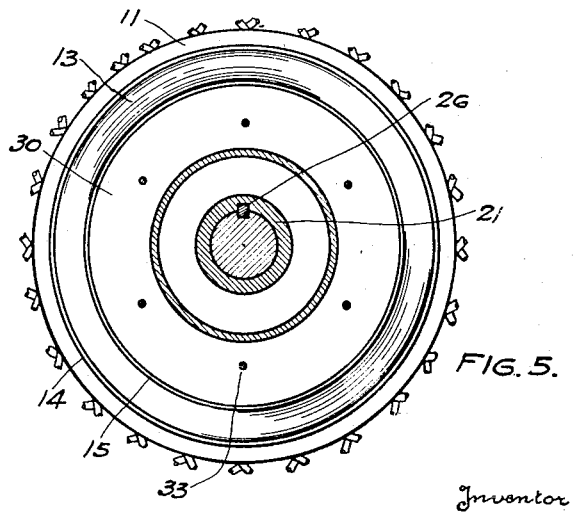
Fig. 5 is a rear view of the hub portion of the wheel shown in Fig. 2, the brake drum being omitted.

The hub 20 shown in Fig. 1 differs from the hub 21 shown in Fig. 2 by reason of the difference in the relationship of these hubs to the wheel axles 22 and 23. The hub 20 is intended to rotate about the axle 22 on suitably formed anti-friction bearings 24 and its outer end is closed by a cap 25 while the hub 21 is adapted to be driven by the axle 23 and has a key and spline connection 26 therewith, see particularly Figs. 2 and 5. Each of the hubs 20 and 21 is provided adjacent its inner end with a flange 30 which terminates in an outwardly extending lip 31 and serves as a support for a brake drum 32 which is secured thereto by a series of bolts 33. Each of the hubs 20 and 21 is also provided at its outer end with a radially and axially extending flange 35 having a radial portion 36 and an annular outer portion 37. The outer periphery of the annular portion 37 of the flange 35 is provided with corrugations 38 which correspond to the corrugations 18 in the flange 16 of the hub shell.

Referring particularly to Figs. 1 and 2 it will be noted that when the wheel and hub are assembled in the usual way the corrugations 18 in the shell mesh with the corrugations 38 on the hub and the wall 15 of the ring 13 rests upon the lip 31. Thus the corrugations constitute an interlocking connection between the shell and the hub and the lip 31 functions as a land and support for the inner end of the wheel. Since both the lip 31 and the wall 15 are unsupported at the abutting ends they can be formed at such an angle that upon assembly one of the elements will be compressed thus insuring a close sliding contact between them when the wheel is in the proper position. By reason of the inclinations of the corrugations 18 and 38 they limit the assembly of the shell and hub. When thus assembled the wheel may be secured in position by means of a cap 40. The cap 40 terminates at its outer periphery in a flange 41 which slides over the outer end of the hub shell 11 and is also provided with a central ring 42 which enters the opening defined by the annular flange 35. The inner periphery of the portion 37 of the flange 35 is preferably threaded at 43 and the outer periphery of the ring 42 is similarly threaded so that the cap 40 can be quickly turned down into position. In order to hold the cap in this position there are provided a pair of pins 45 which enter at one end depressions 46 formed in the cap, the other end passing through openings in tongues 47 which project inwardly from the flange 42. Suitable springs 48 surrounding the pins 45 tend to force them to project from the inner side of the tongues 47. In the outer face of the portion 36 of the flange 35 are formed a plurality of depressions 49 arranged in a circle and so located that the tips of the pins 45 may enter such depressions. The depressions 40 preferably are uneven in number so that only one of the pins 45 will enter one of the depressions 49 and prevent any inadvertent loosening of the cap, the other pin being at that time idle.

The cap 40 is preferably provided at its inner face with an annular recess 50 at the base of the ring 42 so that it bears only against the outer face of the flange 16. Thus any looseness in the interlocking connection of the shell and hub will be taken up by tightening the cap 40. Any suitable means for turning the cap 40 may be provided such as for instance by forming in the outer face of the cap a depression 51 the walls of which define a square, hexagonal or other non-circular outline adapted to be engaged by a correspondingly formed wrench.

While one embodiment of this invention is set forth in the drawings and specification it will be understood that applicant is not limited thereto since other embodiments migh be made without departing from the spirit and scope of the invention as set forth in the following claims.

I claim:

1. A vehicle wheel having in combination, a hub shell, a hub extending within the shell having a laterally projecting flange, means for supporting the shell upon the hub including a member secured to the shell within the latter and having a flange spaced radially inwardly from the shell and adapted to seat upon the hub flange aforesaid, one of said flanges being resilient thereby insuring a tight engagement between the flanges.

2. A vehicle wheel having in combination, a hub shell, a hub extending within the shell having a projecting portion, means for supporting the shell upon the hub including a member secured to the shell within the latter and having a lateral flange spaced radially inwardly from the shell and adapted to seat upon the projecting portion of the hub, said flange being resilient thereby insuring a tight engagement between the same and projecting portion aforesaid.

3. A vehicle wheel having in combination, a hub, a shell surrounding the hub having an interlocking engagement with the hub at the front end thereof and having a laterally extending resilient flange at the rear end thereof spaced inwardly from the shell and seated upon the hub and means independent of the interlocking engaging portions aforesaid of the hub and shell for clamping the latter to the former.

4. A vehicle wheel having in combination, a hub, a shell surrounding the hub, cooperating means upon the front end of the hub and shell forming an interlocking connection between the hub and shell, a resilient flange upon the rear end portion of the shell spaced radially inwardly from said shell and adapted to seat upon a portion of the hub and means detachably engaging the front end of said hub and having a portion engageable with the corresponding end of the shell for securing the same against axial displacement relative to the hub.

5. A vehicle wheel having in combination, a hub shell, a hub extending within the shell having a radially extending flange provided with an axially projecting annular flange, means for supporting the shell upon the hub including an axially extending annular flange carried by the rear portion of the shell within the boundary of the latter, said flange being resilient and having an internal diameter slightly smaller than the external diameter of the annular axially extending hub flange aforesaid and adapted to be sleeved over the latter for resiliently engaging the same.

6. A vehicle wheel having in combination, a hub shell having conical corrugations at the front end thereof, a hub extending within the shell and having corresponding corrugations at the front end thereof engaging the corrugations on the shell for limiting the engagement of the latter with the hub, means for supporting the rear end portion of the shell in radial spaced relation to the hub including a flange carried by the shell and adapted to seat upon an adjacent part of the hub.

7. A vehicle wheel having in combination, a hub shell, a hub extending within the shell having an axially projecting flange, means for resiliently supporting the shell upon the hub including a member secured to the shell within the latter and having a resilient flange spaced radially inwardly from the shell and adapted to seat upon the hub flange aforesaid, and means detachably carried by the front end of the hub and having a portion engageable with the corresponding end portion of the shell for securing the latter upon the inner hub with the flange aforesaid thereof in engagement with the axial flange on the inner hub.

8. A vehicle wheel having in combination, a hub shell, a hub extending within the shell and having an axially projecting flange, means for supporting the shell upon the hub including an annular member secured to the shell within the latter and having an axially projecting resilient flange adapted to seat upon the hub flange aforesaid, and means independent of said annular member for detachably securing the shell upon said hub.

9. A vehicle wheel having in combination, a hub shell, a hub extending within the shell having an axially extending annular flange portion, means carried by the shell for supporting the latter upon the hub including an axially extending annular flange located within and spaced radially inwardly of the shell, said latter flange having an internal diameter slightly smaller than the external diameter of the annular flange portion on the hub and adapted to resiliently engage the latter upon axial relative displacement of the shell and hub, and means detachably engageable with the front side of the hub and having a portion for engaging the hub shell to secure the same in position upon the hub.

10. A vehicle wheel having in combination, a hub shell, means carried by the hub shell for resiliently supporting the latter upon the hub including a resilient flange spaced radially inwardly from the shell within the latter and engageable with a portion of the hub, and means detachably engaging the front end of the hub centrally thereof and having a portion engageable with the front side of the hub shell for securing the same in position upon the hub.

11. A vehicle wheel having in combination, a hub, a shell surrounding the hub, cooperating interfitting corrugations upon the front end of the hub and shell disengageable from each other upon relative axial movement of the shell and hub, and cooperating engaging means upon the rear end portions of the hub and shell for positioning and resiliently supporting the latter relative to the former.

12. A vehicle wheel having in combination, a hub, a shell surrounding the hub, cooperating engaging means associated with the hub and shell adjacent the rear ends thereof for resiliently supporting the latter from the former, and means detachably engaging the front end of the hub centrally thereof and having a portion engageable with the front side of the shell for clamping the same to the hub.

13. A vehicle wheel having in combination, a hub shell, a hub extending within the shell, means for supporting the rear end of the shell upon the hub including a flange portion carried by the shell and located within the latter for engaging a portion of the hub, one of the aforesaid portions being resilient to insure a tight sealing engagement therebetween, and means at the front end of the hub for clamping the shell to the hub including a member detachably secured to the hub centrally thereof and having a portion engageable with said shell.

14. A vehicle wheel having in combination, a hub shell, a hub extending within the shell having a laterally projecting seat portion, means for supporting the shell upon the hub including a member secured to the shell within the latter and having a portion spaced radially inwardly from the shell and adapted to sleeve over the seat portion on the hub, the dimensions of the two aforesaid portions being so determined with respect to each other as to effect a wedging engagement therebetween and one of said portions being resilient to insure a tight engagement between the same and the other of said portions.

15. A vehicle wheel having in combination, a hub, a shell surrounding the hub, cooperating engaging means associated with the hub and shell adjacent the rear ends thereof for resiliently supporting the shell from the hub, means at the front end of the shell and hub establishing a driving connection therebetween, and means other than said last named means for detachably securing the shell to the hub.

16. A vehicle wheel having in combination, a hub shell having conical corrugations at the front end thereof, a hub extending within the shell and having corresponding corrugations at the front end thereof engaging the corrugations on the shell for limiting the engagement of the latter with the hub and for establishing a driving connection therebetween, and cooperating engaging means associated with the hub and shell adjacent the rear ends thereof for resiliency supporting the shell from the hub.

17. A vehicle wheel having in combination, a hub shell, a hub extending within the shell having an axially extending portion, means carried by the shell for resiliently supporting the latter upon the inner hub including a resilient flange spaced radially inwardly from the shell and adapted to seat upon the axially extending portion aforesaid of the hub, and means detachably engaging the front end of the hub centrally thereof and having a portion engageable with the front side of the shell for securing the same to the hub with the flange aforesaid of the shell in engagement with the axially extending portion of the hub.

JOHN WILLIAM WHITE.